United States Patent [19]

Oishi et al.

[11] Patent Number: 4,513,929
[45] Date of Patent: Apr. 30, 1985

[54] MAGNETIC TAPE CASSETTE

[75] Inventors: Kengo Oishi; Osamu Suzuki, both of Kanagawa, Japan

[73] Assignee: Fuji Photo Film Co., Ltd., Kanagawa, Japan

[21] Appl. No.: 494,470

[22] Filed: May 13, 1983

[30] Foreign Application Priority Data

May 13, 1982 [JP] Japan .............................. 57-68716[U]

[51] Int. Cl.³ .......................... G03B 1/04; G11B 15/32
[52] U.S. Cl. ..................................... 242/198; 360/132
[58] Field of Search ................................ 242/197–200, 242/71.7, 71.1; 360/93, 96.1, 132; 206/389, 391, 393

[56] References Cited

U.S. PATENT DOCUMENTS 3,087,686  4/1963  Wren ................................. 242/198
3,146,316  8/1964  Knoth ................................ 360/132
4,106,724  8/1978  Higashida ......................... 242/198

Primary Examiner—Leonard D. Christian
Attorney, Agent, or Firm—Sughrue, Mion, Zinn, Macpeak, and Seas

[57] ABSTRACT

A magnetic tape cassette having a pair of reels each having a peripheral portion provided with a gear. A slide type brake member engages the gears to stop rotation of said reels. A brake releasing bar insertion hole cut in a cassette half thereof is maintained covered by the brake member, so that the inside of said cassette is isolated from the outside. The brake member is urged towards the brake releasing bar insertion hole by a spring member.

2 Claims, 6 Drawing Figures

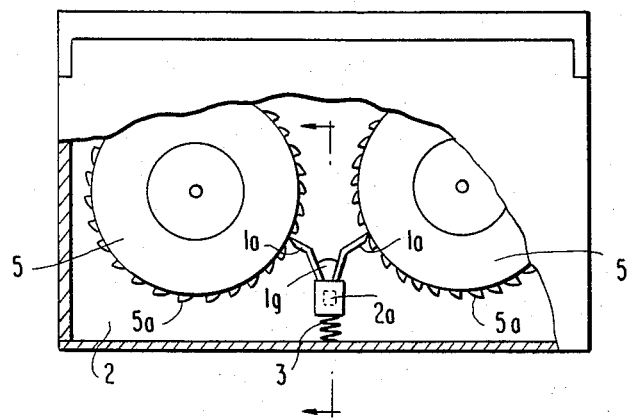

MAGNETIC TAPE CASSETTE

BACKGROUND OF THE INVENTION

This invention relates to magnetic tape cassettes. In particular, it relates to a small video cassette having a slide type brake member which is adapted to stop the rotation of the tape reels in the cassette.

The structure of a conventional brake member of this type is as shown in FIGS. 1, 2, and 3. FIG. 1 is a perspective view of the brake member. FIG. 2 is a sectional view showing a state of the brake member when the cassette is stored (or not in use), and FIG. 3 is a sectional view showing another state of the brake member when the cassette is in use.

The brake member 1 has an internal hole 1b receiving an actuating pin to move the member. A pair of arms 1a engage gears on the reels to prevent motion. The arms 1a have notched recesses 1c to reduce sliding friction by reducing the sliding contact surface area between the brake member and the cassette.

As shown in FIG. 2, a brake member 1 (FIG. 1) is arranged in alignment with a brake releasing bar insertion hole 2a in the lower half 2 of the cassette. The brake member 1 is biased towards reels 5, so that each end part 1a of the brake member 1 locks the gear 5a of a respective reel 5. Since the end portions are angularly spread effective locking of both reels occurs. The brake member 1 is depressed against the lower half 2 by an elastic member 4. The prior art magnetic tape cassette is constructed as described above.

When the cassette is not in use, the reels 5 are not turned and accordingly, the tape is not slackened or unwound. When the cassette is used, a brake releasing bar 6 having a tapered insertion end is inserted into the brake member from the video deck as shown in FIG. 3. The tapered end portion bears against the lower wall of brake member to slide it away from the reels 5. As the member 1 moves to the left, the reels are unlocked.

The brake member 1 has a hole 1b and recesses 1c as illustrated in FIGS. 1 through 3. Therefore, not only when the cassette is used, but also when it is not used (or it is stored) dust or the like may enter into the cassette as indicated by the arrows in FIG. 3. If dust or the like enters the cassette, the picture recording and reproducing characteristics of the tape is ultimately lowered, for instance, because of signal drop-out. In a small video cassette, the possibility that dust or the like enters the cassette is further increased because these units are widely used in conjunction with portable systems.

SUMMARY OF INVENTION

Accordingly, an object of this invention is to eliminate the above-described difficulty in cassette systems.

The foregoing and other objects of the invention has been achieved by the provision of a magnetic tape cassette comprising a pair of tape reels each having a peripheral portion provided with a gear. A slide type brake member engages the gears to stop motion of the reels. A brake releasing bar insertion hole cut in a cassette half thereof is maintained covered by the brake member, so that the inside of the cassette is isolated from the outside environment.

This invention will be described in greater detail with reference to the accompanying drawing and the description of the preferred embodiment that follows.

BRIEF DESCRIPTION OF THE DRAWINGS

FIG. 6 is a top plan view, partially broken away, of the magnetic tape cassette according to the present invention.

DESCRIPTION OF THE PREFERRED EMBODIMENT

Figure 1:
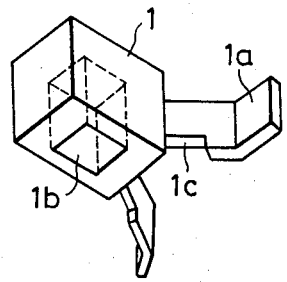
FIG. 1 is a perspective view of the brake member in a conventional magnetic tape cassette.
Figure 2:
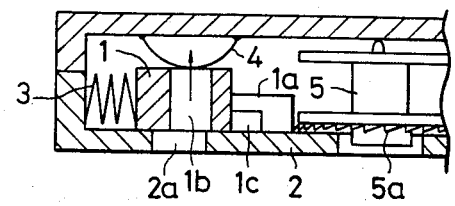
FIG. 2 is a sectional view showing a state of the brake member when the cassette is stored (or not in use)
Figure 3:
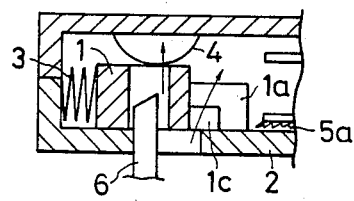
FIG. 3 is a sectional view showing a second state of the brake member when the cassette is in operation.
Figure 4:
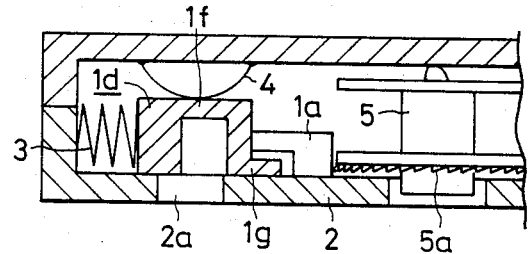
FIG. 4 is a sectional view taken along the line 4—4 in FIG. 6 showing a state of the brake member in a magnetic tape cassette according to this invention when the cassette is stored (or not in use)

In one embodiment of the invention shown in FIG. 4 which achieves the above-described object, the brake member is biased towards the brake releasing bar insertion hole 2a by a spring member 3. The embodiment will be described with reference to FIGS. 4 and 5, in which those components which have been previously described with reference to FIGS. 1 through 3 are therefore designated by the same reference numerals or characteristics. FIG. 4 is a sectional view showing a state of the brake member when the cassette is stored (not in use), and FIG. 5 is a sectional view showing a second state of the brake member when the cassette is in operation.

The brake member 1d is arranged in alignment with a brake releasing bar insertion hole 2a cut in the lower half 2 of the cassette. The cassette is normally formed by jointing two halves. The brake member 1d is biased towards the reels 5 by the spring member 3, so that its end portions 1a engage and lock the gears 5a of the reels 5. The brake member 1d is urged towards the brake releasing bar insertion hole 2a by the elastic member 4. In the preferred embodiment of the invention, the brake member 1 shown in FIGS. 1 through 3 is modified so that the upper portion of the through-hole 1b thereof is closed by a cover part 1f. The member 1 also has a sliding part 1g which closes the recesses 1c.

With the brake member 1d formed as described above, dust or the like is prevented from entering the cassette body through the brake releasing bar insertion hole 2a. The picture recording and reproducing characteristic of the tape is therefore maintained.

Figure 5:
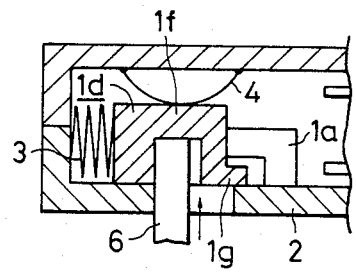
FIG. 5 is a sectional view similar to FIG. 4 showing a second state of the brake member of the invention when the cassette is in operation.

When the cassette is in operation, the brake releasing bar 6 is inserted into the brake member from the video deck as shown in FIG. 5. Hence, when the brake member 1d slides away from the reels 5, they are unlocked. Under this condition also, the brake releasing bar insertion hole 2a is closed by the brake member 1d. Accordingly, the above-described dust-protection effect is maintained.

We claim:

1. A magnetic tape cassette comprising a pair of reels rotatably mounted in said cassette with each reel having a geared peripheral portion, a brake member slidably mounted in said cassette for selectively engaging said gears to stop rotation of said reels and a brake releasing bar insertion hole located in a portion of said cassette adjacent said brake member, said brake member being comprised of a cover portion having a blind bore therein slidably engaging said cassette with said blind bore in communication with said hole whereby the inside of said cassette is isolated from the outside environment and a pair of end portions extending from said cover portion for engaging the geared peripheral portion of the respective reels.

2. A magnetic tape cassette as set forth in claim 1 further comprising spring means biasing said brake member toward engagement with the geared peripheral portions of said reels.

* * * * *